United States Patent Office 3,136,742
Patented June 9, 1964

3,136,742
PROCESS FOR THE MANUFACTURE OF
ACROLEIN COPOLYMERS
Wolfgang Göltner, Kriftel, Taunus, and Paul Schlack,
Leitershofen, near Augsburg, Germany, assignors to
Farbwerke Hoechst Aktiengesellschaft vormals Meister
Lucius & Brüning, Frankfurt am Main, Germany, a
corporation of Germany
No Drawing. Filed Apr. 5, 1960, Ser. No. 19,999
Claims priority, application Germany Apr. 7, 1959
7 Claims. (Cl. 260—73)

The present invention relates to a process for the manufacture of acrolein copolymers.

It is known to copolymerize acrolein in an aqueous medium under the influence of radical-forming catalysts with other vinyl monomers. As suitable copolymerization components for acrolein there have already been proposed acrylic acid derivatives having terminal $CH_2=C<$ groups, such as acrylonitrile, acrylic acid amide and acrylic acid alkyl esters; also methacrylic acid amide is well suited.

Copolymers of acrolein which are not cross-linked via carbon-carbon bonds and contain for the greater part acrolein, are in general soluble in aqueous sulfurous acid or in aqueous solutions of bisulfites of an alkali metal so that polymers of this type are especially valuable for an application on an industrial scale. It is in many cases desirable to raise the content of non-aldehyde components as much as possible without the polymers loosing their solubility in bisulfite or aqueous sulfurous acid. This object can be attained in a comparatively easy manner when quite low conversion rates in the course of the polymerization are sufficient. However, this working method cannot be applied in practice because it is uneconomic.

The object of the invention is a process which renders it possible to produce copolymers of acrolein with acrylic acid derivatives, especially acrylonitrile, at a high conversion rate, i.e. rates within the range of 50 to 95%, in most cases 70 to 95%, said copolymers still being completely soluble even when containing a comparatively high proportion of acryl compounds, for example 40 mole percent and more, i.e. up to 80 mole percent, calculated on the copolymer, in aqueous bisulfite or aqueous sulfurous acid. The novel process is characterized by the fact that the polymerization, initiated by radical-forming substances, is carried out in the presence of water and water-soluble compounds of the general formula

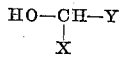

as solvents and/or auxiliary solvents for the monomers, in which general formula X represents hydrogen or a methyl group and Y represents a tetrahydrofuryl-, cyanomethyl-, alkoxymethyl-, α or ω hydroxyalkoxymethyl-, α- or ω hydroxyalkyl radical and wherein the alkyl group may contain up to 3 carbon atoms in linear or branched arrangement. Y may, moreover, represent an acyloxy methyl radical, the acyl radical of which is derived from a saturated aliphatic monocarboxylic acid containing up to 4 carbon atoms in linear or branched arrangement, or a dioxacyclopentyl-1 radical.

The following monomers, for example, enter into consideration as copolymerization components for acrolein: nitriles and amides of acrylic or methacrylic acid, amides of acrylic or methacrylic acid mono- or disubstituted at the nitrogen with alkyl radicals containing up to three carbon atoms, and esters of acrylic acid and methacrylic acid from primary saturated, monohydric aliphatic alcohols containing up to 4 carbon atoms, such as acrylic acid methyl ester and acrylic acid ethyl ester.

Acrylonitrile is most suitable because copolymers having substantially a uniform chemical structure are obtained with its aid. There may, of course, also be applied two or more acrylic acid derivatives for the copolymerization with acrolein.

As solvents and/or auxiliary solvents there may be used in the process of the invention the following compounds: Ethylene glycol, 1.2-propylene glycol, 1.2-butylene glycol, 2.3-butylene glycol, 1.3-butylene glycol, 1.4-butylene glycol, glycol-monomethylether, glycol-monoethylether, propylene - glycol-1-methylether, propylene-glycol-2-methyl- ether, glycerin-monoformal, diethylene-glycol, tetrahydrofuryl alcohol. Finally there may also, with certain precautions, be used cyanhydrines, for example ethylene cyanhydrine. It is also possible—instead of one—to use several solvents and/or auxiliary solvents. From the range of the compounds cited, special mention has to be made of ethylene glycol and, above all, 1.2-propylene glycol which shows the most favorable behavior because, by means of this compound, there are obtained copolymers having a substantially uniform chemical structure. There may also be used monoesters of the aforementioned glycols with preferably saturated aliphatic monocarboxylic acids containing up to 4 carbon atoms, for example glycol monoacetate; these compounds containing ester groupings may, however, be subject to a hydrolysis in the course of working up the polymerization batches whereby losses are incurred, while the simple glycols can be recovered almost without losses.

As catalytically active materials which initiate the reaction, the usual redox catalyst systems may be used with advantage, for example those systems containing as oxidation component ammonium persulfate or an alkali metal persulfate, for example sodium persulfate or potassium persulfate, or hydrogen peroxide and, as a reduction component, for example alkali metal metabisulfite, such as sodium metabisulfite, or silver nitrate, or sodium formaldehyde sulfoxylate, or alkali metal bisulfites. There may also be used combinations of said reduction agents, for example a combination consisting of sodium metabisulfite and silver nitrate. The redox catalyst systems are incorporated in the usual amounts, for example 1 to 10 millimoles per mole of the monomeric mixture. The initiators are admixed in an aqueous solution while the amount of water is suitably limited to amounts within the range of 0.5 to 2.5 mole percent, calculated on the total amount of the monomers.

The reaction proceeds particularly rapidly when applying redox catalyst systems containing as oxidation component alkyl- or aralkylhydroperoxides, such as tertiary butylhydroperoxide, cumene hydroperoxide, pinane hydroperoxide, and as a reduction agent alkali metal metabisulfite, for example sodium metabisulfite or potassium metabisulfite.

The ratio of the solvent mixture, consisting of water and one or several of said organic solvents, to the mixture of monomers may vary within wide limits; however, it is in general advantageous to apply 1.5 to 5 parts by weight, preferably 2 to 4 parts by weight of the solvent mixture per 1 part by weight of the mixture of monomers. The composition of the solvent mixture depends on the type of the monomers and the ratio thereof in the reaction mixture. It has proved to be advantageous to operate with a solvent mixture consisting of 1 part by weight of water and 1.5 to 4.5 parts by weight, preferably 2.5 to 3.5 parts by weight, of an organic solvent. The polymerization is carried out at an acid pH value, suitably at a pH within the range of about 2.5 to 4.5. However, the polymerization may also be effected at a higher pH, for example at pH values up to 6.5. In order to maintain constant a definite pH range, there may be admixed buffer salts, for example a citrate buffer mixture. The duration of the reaction depends on the reactivity of the monomers, the action of the glycols and/or glycol derivatives, the initiator applied and the temperature. In general it is advisable to apply temperatures within the range of about 0° and 30° C. up to 40° C., depending on the constitution of the monomers and the other working conditions, for example the activity exhibited by the initiators. It is possible to apply particularly low temperatures, for example 0° to 20° C., while obtaining a high yield, when initiators on the basis of the aforementioned alkyl- or aralkylhydroperoxides are used. Also the combination of persulfate with silver nitrate admits of operating at a comparatively low temperature, for example 0° to 20° C.

When applying the process according to the invention, it is easily possible, with the application of mixtures of monomers of which more than 50 mole percent, for example 60 to 80 mole percent, consist of acrylonitrile, to attain copolymer yields up to 90 mole percent and higher without said copolymers loosing their solubility in alkali metal bisulfite or in an aqueous sulfurous acid. This also applies to copolymers containing acrylic acid amide provided that the copolymers are rapidly dissolved without intermediate drying.

The sulfur dioxide adducts bisulfite compounds of the copolymers can be formed from their aqueous solutions, suitably after removing the surplus sulfur dioxide or after eliminating the salts (bisulfites) by dialysis, into shaped products, particularly into filaments and sheets, and are, therefore, very valuable from an industrial point of view.

The favorable action of the glycols could not be foreseen since the glycols were expected to cause cross-linking of the polymers and, thereby, insolubility of the products.

The following examples serve to illustrate the invention, but they are not intended to limit it thereto; the parts being by weight:

*Example 1*

In a flask equipped with stirrer, reflux condenser, thermometer and nitrogen inlet tube, 1.9 parts of sodium persulfate were dissolved in a mixture of 215 parts of 1.2-propylene glycol with 40 parts of water while passing through nitrogen. While stirring at room temperature, there were first added to this solution 34 parts of acrolein and 64 parts of acrylonitrile, and then a solution of 1.52 parts of sodium metabisulfite in 45 parts of water. While stirring and passing through nitrogen, the batch was maintained at a temperature of 40° C. for 14 hours. Then 500 parts of water were added, the fine-grained precipitate was drawn off and washed with 15,000 parts of water. After drying in vacuo at room temperature, the yield amounted to 91 parts which represents 84% of the theoretical yield.

The product was colorless and readily soluble in an aqueous solution of sodium bisulfite or sulfur dioxide.

$\eta$ rel.=1.60

Nitrogen content (determined according to Kjeldahl) =16.5%.

*Example 2*

15.5 parts of acrolein and 34.3 parts of acrylonitrile were added to a solution consisting of 0.98 part of sodium persulfate in a mixture of 20 parts of water with 107 parts of ethylene glycol. While passing in nitrogen, a solution consisting of 0.71 part of sodium metabisulfite in 23.5 parts of water was added to the batch at a temperature of 40° C. After 7 hours, the mixture was worked up at 40° C., as described in Example 1.

Yield: 40.5 parts (81% of the theoretical yield).

The copolymer was almost completely soluble at 60° C. in an aqueous solution of 20% strength of sodium bisulfite.

Nitrogen content (determined according to Kjeldahl) =16.3%.

*Example 3*

While passing in nitrogen at 40° C., 15 parts of a mixture of 17 parts of acrolein and 37 parts of acrylonitrile were stirred into a solution consisting of 100 parts of 1.2-propylene glycol, 40 parts of water, 0.71 part of sodium persulfate and 0.57 part of sodium metabisulfite. The remaining 39 parts of the combined acrolein/acrylonitrile mixture were added dropwise to the reaction mixture within two hours. After a reaction period of 22 hours at 40° C., 45 parts (which represents 83% of the theoretical yield) of a colorless copolymer were isolated according to the method described in Example 1.

$\eta$ rel.=1.18

Nitrogen content (determined according to Kjeldahl) =15.8%.

*Example 4*

In an atmosphere of nitrogen, 0.71 part of sodium persulfate was dissolved at 20° C. in a mixture consisting of 125 parts of 1.3-butylene glycol and 10 parts of water. 22.4 parts of acrolein and 32 parts of acrylonitrile were added to this solution, and a solution of 0.57 part of sodium metabisulfite in 10 parts of water was added to the reaction mixture. The batch was stirred at 40° C. for 7 hours while passing through nitrogen. The treatment was continued as described in Example 1.

Yield: 38.3 parts (70% of the theoretical yield).

$\eta$ rel.=1.42

Nitrogen content (determined according to Kjeldahl) =14.5%.

*Example 5*

A mixture consisting of 75 parts of 1.4 butylene glycol, 20 parts of water, 0.95 part of sodium persulfate, 22.4 parts of acrolein and 32 parts of acrylonitrile was brought to a temperature of 40° C., while agitating and passing through nitrogen. A solution of 0.76 part of sodium metabisulfite in 25 parts of water was added to the mixture. After 20 hours reaction time at 40° C., the mixture was worked up as described in Example 1.

Yield: 46 parts (88% of the theoretical yield).

$\eta$ rel.=1.39

Nitrogen content (determined according to Kjeldahl) =14.3%.

*Example 6*

15.5 parts of acrolein and 34.3 parts of acrylonitrile were stirred at 20° C. into a mixture consisting of 0.54 part of sodium persulfate in 33.5 parts of water and 107 parts of 1.2-propylene glycol to give a homogeneous solution. While passing in nitrogen, a solution of 0.34 part of silver nitrate in 10 parts of water was introduced into the reaction mixture, and the polymerization was carried out for 7½ hours at 20° C., with agitation. Then 750 parts of water were added, the copolymer was drawn off and washed with 500 parts of a sulfuric acid of 0.5% strength. After washing with water until neutral, the reaction product was treated for one hour with a solution of 2 parts of sodium thiosulfate in 1000 parts of water and then washed again with 8,000 parts of water. The copolymer was dried in vacuo at room temperature.

Yield: 39 parts (78% of the theoretical yield).

Nitrogen content (determined according to Kjeldahl) =16.2%.

The copolymer was almost completely soluble in sulfurous acid.

*Example 7*

22.4 parts of acrolein and 32 parts of acrylonitrile were added to a solution consisting of 0.71 part of sodium persulfate in a mixture of 20 parts of water with 110 parts of 1.2-propylene glycol. While agitating and passing through nitrogen, a solution of 0.31 part of sodium bisulfite in 20 parts of water was added to the reaction mixture. The polymerization batch was kept at a temperature of 40° C. for 23 hours. The treatment was continued as described in Example 1.

Yield: 45 parts (83% of the theoretical yield).

η rel.=1.68

Nitrogen content (determined according to Kjeldahl) =14.1%.

*Example 8*

In an atmosphere of nitrogen, 17 parts of acrolein and 37 parts of acrylonitrile were added at 20° C. to a solution of 0.71 part of sodium persulfate in a mixture consisting of 75 parts of tetrahydrofuryl alcohol and 25 parts of water. The batch was heated at 40° C. and then a solution consisting of 0.54 part of sodium metabisulfite in 20 parts of water was added. After a polymerization period of 14 hours at 40° C. 250 parts of a saturated sodium sulfate solution were added to the reaction mixture, the polymer was drawn off and washed with 8,000 parts of water. After drying the product in vacuo at 40° C., the yield was 48 parts which represents 89.5% of the theoretical yield.

η rel.=1.22

Nitrogen content (determined according to Kjeldahl) =15.9.

*Example 9*

In an atmosphere of nitrogen, 28 parts of acrolein and 26.5 parts of acrylonitrile were stirred into a solution consisting of 0.71 part of sodium persulfate in 10 parts of water and 75 parts of glycol monomethylether. 5 parts of an aqueous 0.1 N silver nitrate solution and a solution of 0.57 part of sodium metabisulfite in 10 parts of water were added dropwise to this mixture. The reaction was run at a temperature of 22° C. for 20 hours. The treatment was continued as described in Example 1.

Yield: 42 parts (74% of the theoretical yield).

η rel.=2.18

Nitrogen content (determined according to Kjeldahl) =10.2%.

*Example 10*

A mixture consisting of 7.5 parts of 2-methoxy-propanol-(1), 0.071 part of sodium persulfate and 2 parts of water was combined with 2.0 parts of acrolein and 3.2 parts of acrylonitrile, while passing in nitrogen. After adding a solution of 0.057 part of sodium metabisulfite in 2 parts of water, the mixture was heated at 40° C. for 21 hours. The copolymer was isolated according to the method described in Example 1.

Yield: 4.9 parts (94% of the theoretical yield).

Nitrogen content (determined according to Kjeldahl) =16.0%.

The product was almost completely soluble in an aqueous sulfur dioxide solution.

*Example 11*

28.5 parts of acryloamide were dissolved in a solution of 0.71 part of sodium persulfate in 20 parts of water and 75 parts of 1.2-propylene glycol. 28 parts of acrolein and a solution of 0.57 part of sodium metabisulfite in 20 parts of water were added to this mixture and the batch was heated at 40° C. for 21 hours, while agitating and passing in nitrogen. After working up the reaction mixture as described in Example 1, the yield amounted to 29.3 parts (52% of the theoretical yield).

Nitrogen content (determined according to Kjeldahl) =7.6%.

When still moist from the processing, the copolymer was completely soluble in aqueous sulfurous acid, but is was no longer soluble in the dry state.

*Example 12*

A solution of 0.52 part of sodium metabisulfite in 80 parts of water was added at 20° C. to a mixture consisting of 350 parts of 1.2-propylene glycol, 100 parts of water, 50.4 parts of acrolein, 58.3 parts of acrylonitrile and 0.72 part of tertiary butylhydroperoxide, while agitating and passing in nitrogen. The batch was stirred for one hour at a temperature of 40° C. The treatment was continued as described in Example 1.

Yield: 82 parts (75% of the theoretical yield).

η rel.=2.28

Nitrogen content (determined according to Kjeldahl) =12.7%.

*Example 13*

22.4 parts of acrolein and 42 parts of acrylic acid methyl ester were added at 20° C. to a solution consisting of 0.36 part of tertiary butylhydroperoxide in 75 parts of 1.2-propylene glycol, while passing in nitrogen. Then a solution of 0.76 part of sodium metabisulfite in 40 parts of water was added to this mixture, and the reaction was run at a temperature of 40° C. for 20 hours, with agitation. When continuing the treatment as described in Example 1, there were obtained 45 parts of a copolymer (73% of the theoretical yield).

η rel.=1.21

Content of methoxy groups: 22.6%.

*Example 14*

20.7 parts of acrolein and 29.4 parts of acrylonitrile were stirred at 40° C. into a mixture consisting of 0.88 part of sodium persulfate, 20 parts of water and 107 parts of glycerine monoformal, while passing through nitrogen. A solution of 0.70 part of sodium metabisulfite in 23.5 parts of water was added to the batch, and the reaction mixture was maintained at 40° C. for 20 hours. The treatment was continued as described in Example 1.

Yield: 31 parts (62% of the theoretical yield).

η rel.=1.34

Nitrogen content (determined according to Kjeldahl) =15.3%.

In order to measure the viscosity, solutions of 1% strength of the copolymers in sulfurous acid of 10% strength were used in all examples analogously to the working method applied by W. Kern and collaborators (Makromolek. Chem., vol. 24, page 151 (1957)). 500 mg. of a copolymer in 25 ml. of a 10% solution of sulfur dioxide were dissolved in a measuring flask (capacity 50 ml.). Then the flask was filled with a 10% solution of sodium chloride to the measuring line, and the transit time of the solution was determined in the Ostwald viscosimeter at 20° C. As is well-known, the transit time of the solution divided by the transit time of the solvent is equal to the relative viscosity (η rel.).

We claim:

1. A process for the production of copolymers of acrolein and another acrylic acid derivative having a terminal $CH_2=C<$ group which comprises copolymerizing acrolein with said acrylic derivative in the presence of a redox catalyst system at a temperature within the range of about 0° C. to 40° C. at a pH within the range of 2.5 to 6.5 in a solvent mixture comprising one part by weight water and about 1.5 to 4.5 parts by weight of at least one organic solvent of the general formula

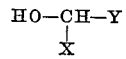

wherein X represents a member selected from the group consisting of hydrogen and the methyl group, and Y represents a member selected from the group consisting of alkoxymethyl-, α-hydroxyalkoxymethyl-, ω-hydroxyalkoxymethyl-, α-hydroxyalkyl-, ω-hydroxyalkyl radicals, the alkyl groups of said radicals containing up to 3 carbon atoms, an acyloxy methyl radical, the acyl group of which is derived from a saturated aliphatic monocarboxylic acid with up to 4 carbon atoms, a tetrahydrofuryl-, cyanomethyl- and a dioxacyclopentyl-1 radical, the ratio by weight of the solvent mixture to monomers being about 1.5 to 5:1.

2. A process as claimed in claim 1, wherein 1.2-propyleneglycol is used as organic solvent.

3. A process as claimed in claim 1, wherein a redox catalyst system consisting of an alkali metal persulfate and an alkali metal metabisulfite is used.

4. A process as claimed in claim 1, wherein a redox catalyst system consisting of a member selected from the group consisting of alkylhydroperoxides and aralkylhydroperoxides, and an alkali metal metabisulfite is used.

5. A process for the production of copolymers of acrolein and another acrylic acid derivative having a terminal $CH_2=C<$ group, which comprises copolymerizing acrolein with a monomer selected from the group consisting of acrylonitrile, acrylic acid amide, acrylic acid amide monosubstituted at the nitrogen with an alkyl radical containing up to 3 carbon atoms, acrylic acid amide disubstituted at the nitrogen with alkyl radicals containing up to 3 carbon atoms, esters of acrylic acid with primary saturated monohydric aliphatic alcohols containing up to 4 carbon atoms, methacrylonitrile, methacrylic acid amide, methacrylic acid amide monosubstituted at the nitrogen with an alkyl radical containing up to 3 carbon atoms, methacrylic acid amide disubstituted at the nitrogen with alkyl radicals containing up to 3 carbon atoms, esters of methacrylic acid with primary saturated monohydric aliphatic alcohols containing up to 4 carbon atoms, in the presence of a redox catalyst system at a temperature within the range of about 0° C. to 40° C. at a pH within the range of 2.5 to 6.5 in a solvent mixture comprising one part by weight water and about 1.5 to 4.5 parts by weight of at least one organic solvent of the general formula $$HO-CH-Y$$
$$\quad\quad\;\; |$$
$$\quad\quad\;\; X$$

wherein X represents a member selected from the group consisting of hydrogen and the methyl group, and Y represents a member selected from the group consisting of alkoxymethyl-, α-hydroxyalkoxymethyl-, ω-hydroxyalkoxymethyl-, α-hydroxyalkyl-, ω-hydroxyalkyl radicals, the alkyl groups of said radicals containing up to 3 carbon atoms, an acyloxy methyl radical, the acyl group of which is derived from a saturated aliphatic monocarboxylic acid with up to 4 carbon atoms, a tetrahydrofuryl-, cyanomethyl- and a dioxacyclopentyl-1 radical, the ratio by weight of the solvent mixture to monomers being about 1.5 to 5:1.

6. A process as claimed in claim 5, wherein acrolein and acrylonitrile are copolymerized.

7. A process as claimed in claim 5, wherein a mixture consisting of 40 to 80 mole percent of acrylonitrile and 60 to 20 mole percent of acrolein are copolymerized.

References Cited in the file of this patent

UNITED STATES PATENTS

| | | |
|---|---|---|
| 2,580,315 | Park | Dec. 25, 1951 |
| 2,657,192 | Miller et al. | Oct. 27, 1953 |
| 2,996,481 | Eifert et al. | Aug. 15, 1961 |